(12) United States Patent
Samie et al.

(10) Patent No.: US 8,177,677 B2
(45) Date of Patent: May 15, 2012

(54) MULTI-SPEED TRANSMISSION WITH SELECTABLE ONE-WAY BRAKING CLUTCH

(75) Inventors: Farzad Samie, Franklin, MI (US); Chunhao J. Lee, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 447 days.

(21) Appl. No.: 12/404,670

(22) Filed: Mar. 16, 2009

(65) Prior Publication Data

US 2010/0234166 A1    Sep. 16, 2010

(51) Int. Cl.
    *F16H 37/06*    (2006.01)
(52) U.S. Cl. .................. 475/324; 475/327; 475/281
(58) Field of Classification Search .......... 475/280–281, 475/326, 327, 269, 325
    See application file for complete search history.

(56) References Cited

U.S. PATENT DOCUMENTS

| | | | |
|---|---|---|---|
| 6,398,684 B1 | 6/2002 | Kaizu | |
| 6,723,018 B2 | 4/2004 | Hayabuchi et al. | |
| 6,887,178 B2 | 5/2005 | Miyazaki et al. | |
| 7,029,416 B2 * | 4/2006 | Miyazaki et al. | 475/275 |
| 7,198,587 B2 | 4/2007 | Samie et al. | |
| 7,258,647 B2 * | 8/2007 | Shim | 475/278 |
| 7,294,087 B2 | 11/2007 | Hayabuchi et al. | |
| 7,686,730 B2 * | 3/2010 | Baldwin | 475/276 |
| 2002/0091032 A1 * | 7/2002 | Hayabuchi et al. | 475/278 |
| 2003/0119623 A1 * | 6/2003 | Stevenson et al. | 475/275 |
| 2006/0264297 A1 * | 11/2006 | Seki et al. | 475/324 |
| 2009/0020386 A1 * | 1/2009 | Kato et al. | 192/48.1 |
| 2009/0084653 A1 * | 4/2009 | Holmes | 192/41 A |
| 2009/0239699 A1 * | 9/2009 | Baldwin | 475/276 |
| 2009/0239700 A1 * | 9/2009 | Wittkopp | 475/276 |

* cited by examiner

*Primary Examiner* — Sherry Estremsky
*Assistant Examiner* — Lillian Nguyen
(74) *Attorney, Agent, or Firm* — Quinn Law Group, PLLC (57) ABSTRACT

A multi-speed transmission for a vehicle is provided with a selectable one-way braking clutch (SOWBC). The transmission has one or more planetary gear sets, and a set of intermeshing gears, which may be a planetary gear set. Multiple torque-transmitting mechanisms are engagable in different combinations to establish at least one reverse speed ratio and multiple forward speed ratios between an input member and an output member. A selectable one-way braking clutch is configured to brake in one rotational direction and is selectively reversible to brake in an opposite rotational direction, and freewheels in some speed ratios.

10 Claims, 9 Drawing Sheets

| | 60 | 62 | 63 | 64 | 66 | 68 | |
|---|---|---|---|---|---|---|---|
| | | | | | | Power | Eng-Brk |
| Rev1 | | X | | | | R | F |
| Rev2 | X | | | | | R | F |
| 1st | | | X | | | F | R |
| 2nd | | | X | | X | F/Neu | F/Neu |
| 3rd | | X | X | | | F/Neu | F/Neu |
| 4th | X | | X | | | F/Neu | F/Neu |
| 5th | | | X | X | | F/Neu | F/Neu |
| 6th | X | | | X | | F/Neu | F/Neu |
| 7th | | X | | X | | F/Neu | F/Neu |
| 8th | | | | X | X | F/Neu | F/Neu |

X = ENGAGED STATE

FIG. 1

| | 60 | 62 | 63 | 64 | 66 | 68 | |
| | | | | | | Power | Eng-Brk |
|---|---|---|---|---|---|---|---|
| Rev1 | | X | | | | R | F |
| Rev2 | X | | | | | R | F |
| 1st | | | X | | | F | R |
| 2nd | | | X | | X | F/Neu | F/Neu |
| 3rd | | X | X | | | F/Neu | F/Neu |
| 4th | X | | X | | | F/Neu | F/Neu |
| 5th | | | X | X | | F/Neu | F/Neu |
| 6th | X | | | X | | F/Neu | F/Neu |
| 7th | | X | | X | | F/Neu | F/Neu |
| 8th | | | | X | X | F/Neu | F/Neu |

X = ENGAGED STATE

|  | 260 | 262 | 263 | 264 | 265 | 266 | 68 | |
|---|---|---|---|---|---|---|---|---|
|  |  |  |  |  |  |  | Power | Eng-Brk |
| 1st | X |  |  |  | X |  | F | R |
| 2nd | X |  |  | X |  |  | F | R |
| 3rd | X |  |  |  | X | X | F/Neu | F/Neu |
| 4th | X |  |  | X |  | X | F/Neu | F/Neu |
| 5th | X |  | X |  | X |  | F/Neu | F/Neu |
| 6th | X |  | X | X |  |  | F/Neu | F/Neu |
| 7th | X | X |  |  | X |  | F/Neu | F/Neu |
| 8th | X | X |  | X |  |  | F/Neu | F/Neu |
| 9th | X | X | X |  |  |  | F/Neu | F/Neu |
| 10th |  | X | X | X |  |  | F/Neu | F/Neu |
| 11th |  | X | X |  | X |  | F/Neu | F/Neu |
| 12th |  | X |  | X |  | X | F/Neu | F/Neu |
| (12th) |  | X |  |  | X | X | F/Neu | F/Neu |
| Rev1 |  |  | X |  | X |  | R | F |
| Rev2 |  |  | X | X |  |  | R | F |

X = ENGAGED STATE

| | 360 | 362 | 363 | 364 | 365 | 366 | 68 | |
| --- | --- | --- | --- | --- | --- | --- | --- | --- |
| | | | | | | | Power | Eng-Brk |
| 1st | X | | | | | X | F | R |
| 2nd | X | | | X | | | F | R |
| 3rd | X | | | | X | X | F/Neu | F/Neu |
| 4th | X | | | X | X | | F/Neu | F/Neu |
| 5th | X | | X | | | X | F/Neu | F/Neu |
| 6th | X | X | | | | X | F/Neu | F/Neu |
| 7th | X | X | X | | | | F/Neu | F/Neu |
| 8th | | X | X | | | X | F/Neu | F/Neu |
| 9th | | X | | | X | X | F/Neu | F/Neu |
| (9th) | | X | | X | X | | F/Neu | F/Neu |
| REV1 | | | X | | | X | R | F |
| REV2 | | | X | X | | | R | F |

X = ENGAGED STATE

| | 460 | 462 | 463 | 464 | 466 | 68 | |
|---|---|---|---|---|---|---|---|
| | | | | | | Power | Eng-Brk |
| 1st | X | | | | | F | R |
| 2nd | X | | | | X | F/Neu | F/Neu |
| 3rd | X | X | | | | F/Neu | F/Neu |
| 4th | X | | | X | | F/Neu | F/Neu |
| 5th | X | | X | | | F/Neu | F/Neu |
| 6th | | | X | X | | F/Neu | F/Neu |
| 7th | | X | X | | | F/Neu | F/Neu |
| 8th | | | X | | X | F/Neu | F/Neu |
| Rev | | X | | | | R | F |

X = ENGAGED STATE

|  | 560 | 562 | 563 | 564 | 566 | 68 | |
|---|---|---|---|---|---|---|---|
|  |  |  |  |  |  | Power | Eng-Brk |
| 1st | X |  |  |  |  | F | R |
| 2nd | X |  |  |  | X | F/Neu | F/Neu |
| 3rd | X | X |  |  |  | F/Neu | F/Neu |
| 4th | X |  |  | X |  | F/Neu | F/Neu |
| 5th |  |  | X | X |  | F/Neu | F/Neu |
| 6th |  | X | X |  |  | F/Neu | F/Neu |
| 7th |  |  | X |  | X | F/Neu | F/Neu |
| Rev |  | X |  |  |  | R | F |

X = ENGAGED STATE

| | 660 | 662 | 663 | 664 | 666 | 68 | |
|---|---|---|---|---|---|---|---|
| | | | | | | Power | Eng-Brk |
| 1st | X | | | | | F | R |
| 2nd | X | | | | X | F/Neu | F/Neu |
| 3rd | X | X | | | | F/Neu | F/Neu |
| 4th | X | | | X | | F/Neu | F/Neu |
| 5th | X | | X | | | F/Neu | F/Neu |
| 6th | | | X | X | | F/Neu | F/Neu |
| 7th | | X | X | | | F/Neu | F/Neu |
| 8th | | | X | | X | F/Neu | F/Neu |
| Rev | | X | | | | R | F |

X = ENGAGED STATE

| | 760 | 762 | 763 | 764 | 766 | 68 | |
|---|---|---|---|---|---|---|---|
| | | | | | | Power | Eng-Brk |
| 1st | X | | | | | F | R |
| 2nd | X | | | | X | F/Neu | F/Neu |
| 3rd | X | X | | | | F/Neu | F/Neu |
| 4th | X | | | X | | F/Neu | F/Neu |
| 5th | X | | X | | | F/Neu | F/Neu |
| 6th | | | X | X | | F/Neu | F/Neu |
| 7th | | X | X | | | F/Neu | F/Neu |
| 8th | | | X | | X | F/Neu | F/Neu |
| Rev | | X | | | | R | F |

X = ENGAGED STATE

FIG. 17

MULTI-SPEED TRANSMISSION WITH SELECTABLE ONE-WAY BRAKING CLUTCH

TECHNICAL FIELD

The invention relates to a multi-speed transmission with a selectable one-way braking clutch.

BACKGROUND OF THE INVENTION

Some automatic transmissions include a low/reverse braking clutch (i.e., a friction brake) that is applied in both a reverse speed ratio and a first forward speed ratio in order to provide reaction torque in both forward and reverse directions. Alternatively, a braking clutch is sometimes used alongside a one-way clutch, with the one-way clutch preventing rotation of a transmission component, such as a carrier member, in either the first or reverse speed ratio, and the braking clutch applied to prevent rotation in the other of the first and the reverse speed ratio. This type of one-way clutch is not selectable, in that it always automatically brakes one direction of rotation of the transmission component and freewheels, i.e., permits the component to rotate, in the opposing direction.

Automatic, multi-speed transmissions that incorporate planetary gear sets typically include multiple friction-type clutches in order to manipulate the transmission to provide many forward speed ratios. Many such components are necessary to provide six, seven, or eight forward speed ratios. The planetary gear sets and clutches become increasingly difficult to package as they increase in number, and also add to the overall weight of the transmission.

As is commonly known to those familiar with the art, disengaged multi-plate friction clutches, depending on various conditions, produce drag when there is relative motion between the sets of clutch plates. One characteristic of a disengaged multi-plate clutch is that, as the relative speed between the sets of clutch plates increases, typically, so does the drag or spin loss. This spin loss contributes to decreased fuel economy.

SUMMARY OF THE INVENTION

A multi-speed transmission for a vehicle is provided that has a selectable one-way braking clutch (SOWBC) in order to reduce part complexity, weight, cost, and spin losses. The SOWBC is selectable so that it can provide reaction force against rotation in either rotational direction. The transmission has an input member, an output member, and a stationary member such as a transmission case. In some embodiments, the transmission has a set of intermeshing gears that could be a planetary gear set. The input member is continuously or selectively connected for rotation with a member of the set of intermeshing gears. The transmission also has a planetary gear set, referred to herein as the first planetary gear set, that has a carrier member rotatably supporting first and second sets of pinion gears, a first sun gear member meshing with the first set of pinion gears, a second sun gear member meshing with the second set of pinion gears, and a ring gear member meshing with the first set of pinion gears. The first and second sets of pinion gears mesh with one another. The output member is connected for rotation with one of the members of the first planetary gear set. First and second selectively engagable rotating clutches are engagable to connect different members of the first planetary gear set and the set of intermeshing gears for common rotation.

The SOWBC is configured to brake in one rotational direction and selectively reversible to brake in an opposite rotational direction. The SOWBC is configured to brake rotation of the carrier member of the first planetary gear set when the transmission is in reverse and first forward speed ratios. The first rotating clutch is engaged and the SOWBC brakes reverse rotation of the carrier member to transmit torque from the input member to the output member in the first forward speed ratio. The second rotating clutch is engaged and the SOWBC brakes forward rotation of the carrier member to transmit torque from the input member to the output member in the reverse speed ratio.

In other embodiments, the transmission has three planetary gear sets, as well as an input member, an output member, and a stationary member. A first of the planetary gear sets has a ring gear member, a carrier member, and a sun gear member. The output member is connected for rotation with the ring gear member of the first planetary gear set. A second of the planetary gear sets has a ring gear member, a carrier member, and a sun gear member. The input member is continuously connected for rotation with the one of the members of the second planetary gear set. A third of the planetary gear sets has a ring gear member, a carrier member, and a sun gear member. A first interconnecting member continuously connects the carrier member of the first planetary gear set for common rotation with the ring gear member of the third planetary gear set. A second interconnecting member continuously connects the sun gear member of the first planetary gear set for common rotation with the carrier member of the third planetary gear set. A first selectively engagable rotating clutch is engagable to connect one of the members of the second planetary gear set for common rotation with the sun gear member of the third planetary gear set. A second selectively engagable rotating clutch is engagable to connect the same or a different member of the second planetary gear set as connected by the first rotating clutch for common rotation with the sun gear member of the first planetary gear set. A SOWBC is configured to brake in one rotational direction and selectively reversible to brake in an opposite rotational direction, the SOWBC being configured to brake rotation of the carrier member of the first planetary gear set when the transmission is in reverse and first forward speed ratios. The first rotating clutch is engaged and the SOWBC brakes reverse rotation of the carrier member to transmit torque from the input member to the output member in the first forward speed ratio. The second rotating clutch is engaged and the SOWBC brakes forward rotation of the carrier member to transmit torque from the input member to the output member in the reverse speed ratio.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
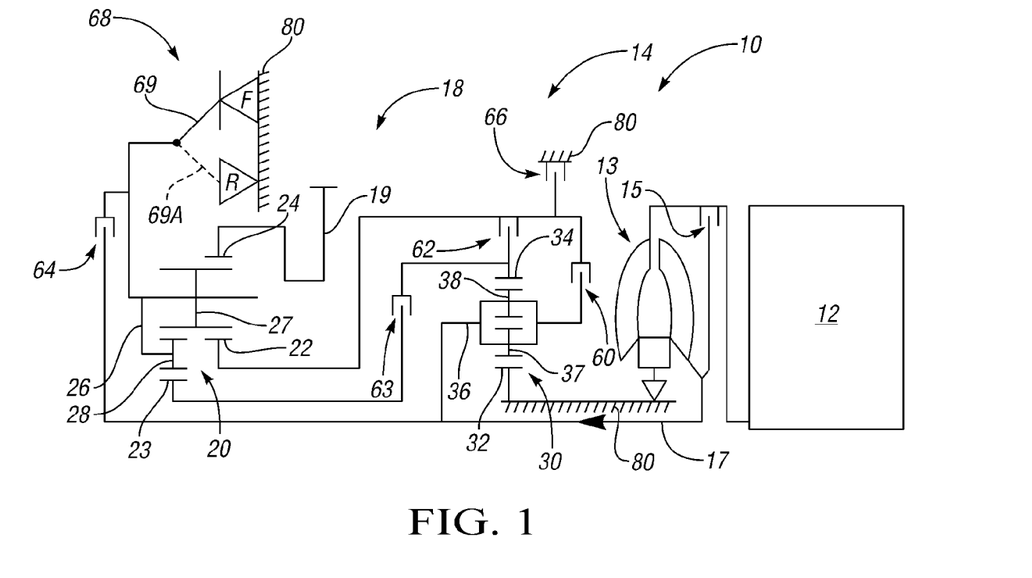
FIG. 1 is a schematic illustration in stick diagram form of a powertrain with a first embodiment of a transmission having an SOWBC.

Referring to the drawings, wherein like reference numbers refer to like components throughout the several views, FIG. 1 schematically illustrates an exemplary powertrain 10 that includes an engine 12 and a planetary transmission 14. The planetary transmission 14 includes an input member 17 operatively connected with the engine 12, a planetary gear arrangement 18, and an output member 19 continuously connected with a final drive mechanism, not shown. A torque converter 13 with a lockup clutch 15, as is typical, may be positioned between the engine 12 and the input member 17. The lockup clutch 15 may be engaged when operating conditions warrant a direction connection between the engine 12 and the input member 17. If no torque converter is present, then an isolator may be positioned between the engine 12 and the input member 17. The planetary gear arrangement 18 includes two planetary gear sets 20 and 30.

The first planetary gear set 20 is a compound planetary gear set that includes a first sun gear member 22, a second sun gear member 23, a carrier member 26, and a ring gear member 24. The carrier member 26 rotatably supports a first set of pinion gears 27 that mesh with both the sun gear member 22 and the ring gear member 24, as well as a second set of pinion gears 28 that mesh with the sun gear member 23 and the first set of pinion gears 27.

The second planetary gear set 30, also referred to herein as a set of intermeshing gears, is a double-pinion type planetary gear set that includes a sun gear member 32, a ring gear member 34, and a carrier member 36 that rotatable supports first and second sets of pinion gears 37, 38, respectively. The first set of pinion gears 37 meshes with the sun gear member 32 and with the second set of pinion gears 38. The second set of pinion gears 38 meshes with the first set of pinion gears 37 and with the ring gear member 34.

The planetary gear arrangement 18 also includes six torque-transmitting mechanisms 60, 62, 63, 64, 66 and 68. The torque-transmitting mechanisms 60, 62 and 63 are rotating-type torque-transmitting mechanisms, commonly termed clutches. Clutches 60, 62, 63 and 64 are multi-plate clutch devices, for example, in a friction launch configuration. The torque-transmitting mechanism 66 is a stationary-type torque-transmitting mechanism, commonly termed a brake or reaction clutch. The torque-transmitting mechanism 68 is an SOWBC, discussed in greater detail below with respect to FIGS. 3, 4 and 5. Clutch 63 is referred to herein as the "first clutch", clutch 60 is referred to herein as the "second clutch", clutch 64 is referred to herein as the "third clutch", clutch 62 is referred to herein as the "fourth clutch", and brake 66 is referred to herein as the "first brake".

The input member 17 is continuously connected with the carrier member 36. The output member 19 is continuously connected with the ring gear member 24. Carrier member 36 is selectively connectable for common rotation with sun gear member 22 by engagement of clutch 60. Ring gear member 34 is selectively connectable for common rotation with sun gear member 22 by engagement of clutch 62. Ring gear member 34 is selectively connectable for common rotation with sun gear member 23 by engagement of clutch 63. Carrier member 36 is selectively connectable for common rotation carrier member 26 by engagement of clutch 64. Sun gear member 22 is selectively grounded to a stationary member (i.e., a non-rotating member), such as the transmission housing 80 by engagement of brake 66. The carrier member 26 is selectively grounded to the transmission housing 80 by engagement of SOWBC 68.

Figure 2:
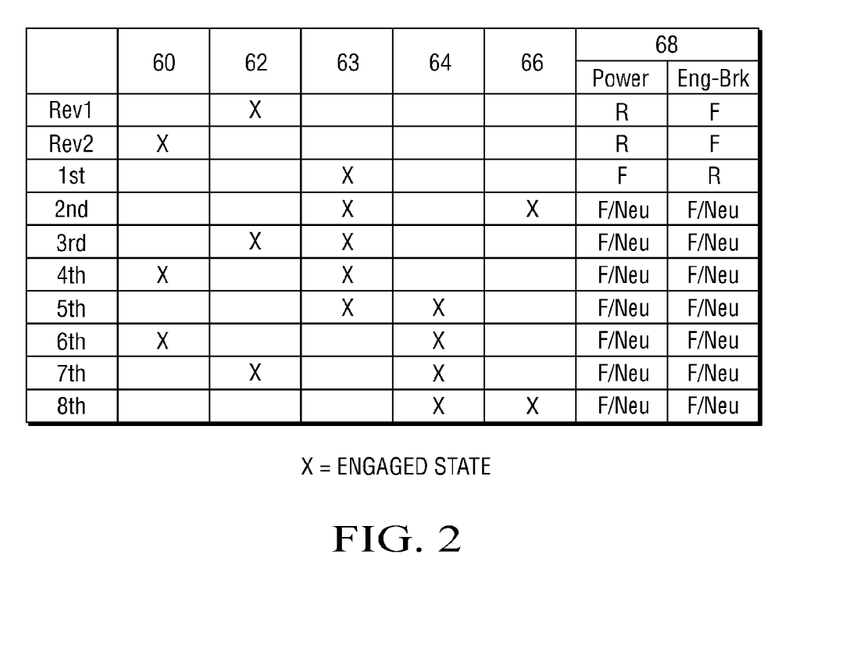
FIG. 2 is a table indicating an engagement schedule for the transmission of FIG. 1.

FIG. 2 is a clutching table, describing operation of the torque-transmitting mechanisms of transmission 14 in various gear states. In the table of FIG. 2, an "X" denotes an engaged clutch or brake. With respect to the SOWBC 68, "R" indicates reverse, "F" indicates forward, and F/Neu indicates freewheeling in the forward direction of rotation. The torque-transmitting mechanisms 60, 62, 63, 64, 66 and 68 are selectively engaged in combinations of two to provide eight forward speed ratios and two reverse speed ratios between the input member 17 and the output member 19. It is clear from FIG. 2 that the SOWBC 68 is engaged both in the reverse, Rev, speed ratio, when power is provided to the output member 19 in a reverse, R, direction of rotation, and when power is provided to the output member 19 in the first forward speed ratios, 1st. Thus, the SOWBC 68 provides reaction torque and prevents forward rotation of the ring gear member 24 in the reverse speed ratio, and provides reaction torque and prevents reverse rotation of the carrier member 26 in the first forward speed ratio. In the second through eighth forward speed ratios, the SOWBC 68 freewheels (i.e., the carrier member 26 spins in a forward direction of rotation, with the SOWBC 68 in the braking reverse state).

The SOWBC 68 is shown schematically in FIG. 1, with a switch element 69 selected to the forward braking position. This position is selected in the Reverse speed ratio, and causes the transmission housing 80 to provide reaction torque and prevents rotation of the carrier member 26 in the forward direction. In the reverse braking position of FIG. 3, the SOWBC 68 will freewheel to allow the carrier member 26 to rotate in the forward direction if the engagement of selected ones of the other clutches 60, 62, 63, 64 and brake 66 places torque in the reverse direction on the carrier member 26, such as in the second through eighth forward speed ratios.

Figure 4:
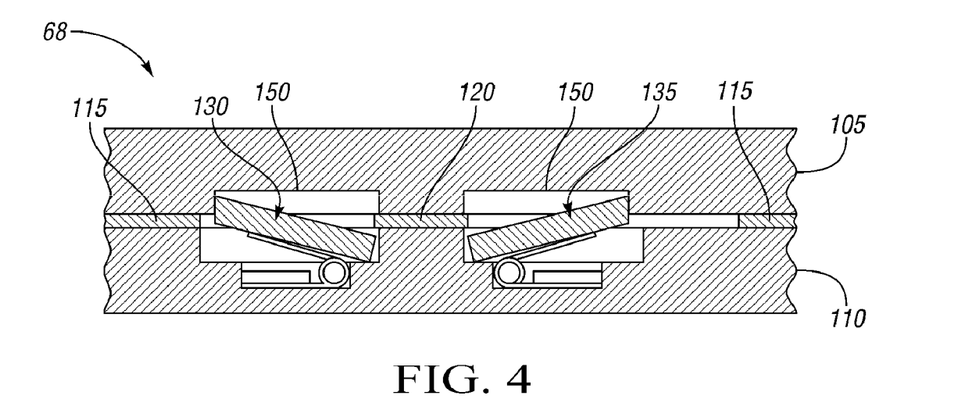
FIG. 4 is a schematic cross-sectional fragmentary illustration of the SOWBC of FIGS. 1, 6, 8, 10, 12, 14 and 16 selected for braking of both reverse and forward rotation.

The switch element 69 is selectively movable to the reverse braking position, shown in phantom as 69A. This position is selected in the first forward speed ratio, and provides reaction torque preventing rotation of the carrier member 26 in the reverse direction. The reverse position of the SOWBC 68, braking both forward and reverse rotation, is shown in FIG. 4. The first member 105, representing an outer race of the SOWBC 68 is splined to a spline on the transmission housing 80. The second member 110 is an inner race of the SOWBC 68 splined to the carrier member 26. A snap ring may be used to keep the SOWBC 68 in place.

The SOWBC 68 may be a controllable mechanical diode clutch or a selectable roller clutch design or other selectable (reversible) one-way clutches. The SOWBC may be hydraulically actuated by a piston and a valve. A number of clutch designs capable of functioning as an SOWBC are envisioned, and this disclosure is not intended to be limited to the particular exemplary embodiments described herein.

Figure 3:
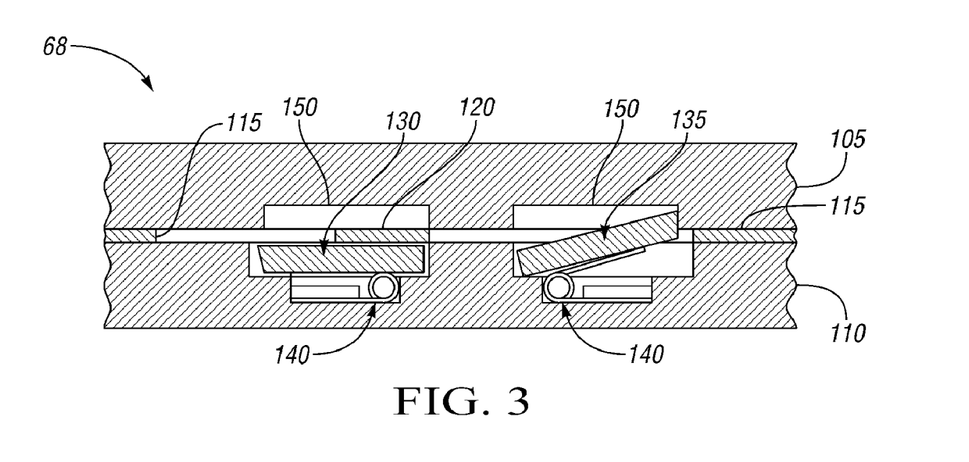
FIG. 3 is a schematic cross-sectional fragmentary illustration of the SOWBC of FIGS. 1, 6, 8, 10, 12, 14 and 16 selected for braking of forward rotation.

Several methods are known to implement an SOWBC. Struts, rockers, rollers, or sprags are different features that can be utilized to selectively couple or decouple the members of the clutch. FIGS. 3 and 4 illustrate in cross-section an SOWBC selecting between forward-locked and reversed-locked operation (FIG. 4) and reverse-locked, forward freewheeling operation (FIG. 3), in accordance with the present disclosure. SOWBC feature 68 comprises the first member 105, the second member 110, a selector plate 115, a selector plate actuation feature 120, a first engagement element 130, a second engagement element 135, two return springs 140, and two engagement features 150. The second member 110 and the selector plate 115 can be rotatable features centered around a common axis of rotation (not shown, but established by the input member 17 of FIG. 1). The members 105 and 110 may be flat circular plates. Selector plate 115 is sandwiched between the two members and generally moves or remains fixed with second member 110. Selector plate 115 includes selector plate actuation feature 120. Selector plate 115 is movable relative to first member 105 by some small rotational angle, so as to provide calibrated movement of selector plate actuation feature 120. Engaging elements 130 and 135, illustrated as struts in this exemplary embodiment, are rotatingly located to second member 110, are oriented substantially normally to the radius of the member 110, and provide the selective coupling and decoupling functions served by the SOWBC 68. Each engaging element, when in an up position, fixedly fits against an engagement feature 150 in first member 105 and prevents second member 110 from rotating relative to first member 105 in one direction. The engagement elements are normally in an up position due to forces exerted by return springs 140. Selector plate 115 can be actuated relative to the engaging elements, such that selector plate actuation feature 120 can be used to depress one of the engagement elements into a down position. The action of the engagement to stop relative rotation depends upon the geometry of the interacting features. If one of the engagement elements 130, 135 is in a down position, then the clutch can freewheel in the direction normally prohibited by the engagement feature now in the down position.

FIG. 3 illustrates SOWBC 68 with one engagement element in a down position and one engagement element in an up position. Engagement element 135 is in an up position and is fit against an engagement feature 150. As a result, second member 110 cannot rotate to the right relative to first member 105. However, engagement element 130 is in a down position. Engagement feature 135 provides substantially zero resistance to second member 110 rotating to the left relative to first member 105. When relative rotation occurs and first member 105 comes into contact with engagement element 135, pressure upon the top, nearly horizontal surface of engagement element 135 creates a downward rotation of engagement element 135. This ratcheting motion of engagement element 135 can continue as engagement element 135 rotates past subsequent engagement features 150. The state of the SOWBC 68 in FIG. 3 is consistent with the switch 69 selecting the reverse braking position, preventing reverse rotation of the second member 110, and thus carrier member 26, but allowing second member 110 and thus carrier member 26 to freewheel in a forward direction of rotation.

FIG. 4 illustrates SOWBC 68 with both engagement elements 130 and 135 in an up position. Selector plate 115 is actuated relative to the engagement elements such that neither engagement element 130 nor engagement element 135 is depressed by actuation feature 120. As a result, rotation of second member 110 in either direction relative to first member 105 is not possible. The state of the SOWBC 68 in FIG. 4 is consistent with the switch 69 selecting the forward braking position, preventing forward rotation of the second member 110, and thus carrier member 26. Alternatively, a SOWBC could be configured with a selection state allowing freewheeling in both directions.

It will be appreciated that the members of an SOWBC are likely to have a plurality of features like SOWBC 68, each actuated similarly to allow or prevent rotation in either direction, with the total torque transmitted through the SOWBC distributed between the SOWBC features. Similar SOWBC features are known in the art for a rocker mechanism with a pair of engagement elements located at distal ends of the rocker, capable similarly of preventing or enabling relative rotation, in combination with engagement features on an opposing member, based upon rocking actuation of the rocker. Rollers or sprags can alternatively be used in members located one radially inside the other, with a gap between the members. The rollers or sprags can be actuated to interact within the gap to selectively couple the members in one or both directions of rotation.

Application of an SOWBC, as described above, to an automatic transmission can reduce parts and increase fuel efficiency. Yet, when the SOWBC 68 needs to be engaged, slip across the clutch must substantially equal zero. There can be no relative rotation (i.e., slip) between the members 105, 110; that is, both members 105, 110 of the SOWBC 68 need to be stationary or, in an embodiment where neither is grounded, need to be rotating at the same speed and in the same direction.

Figure 5:
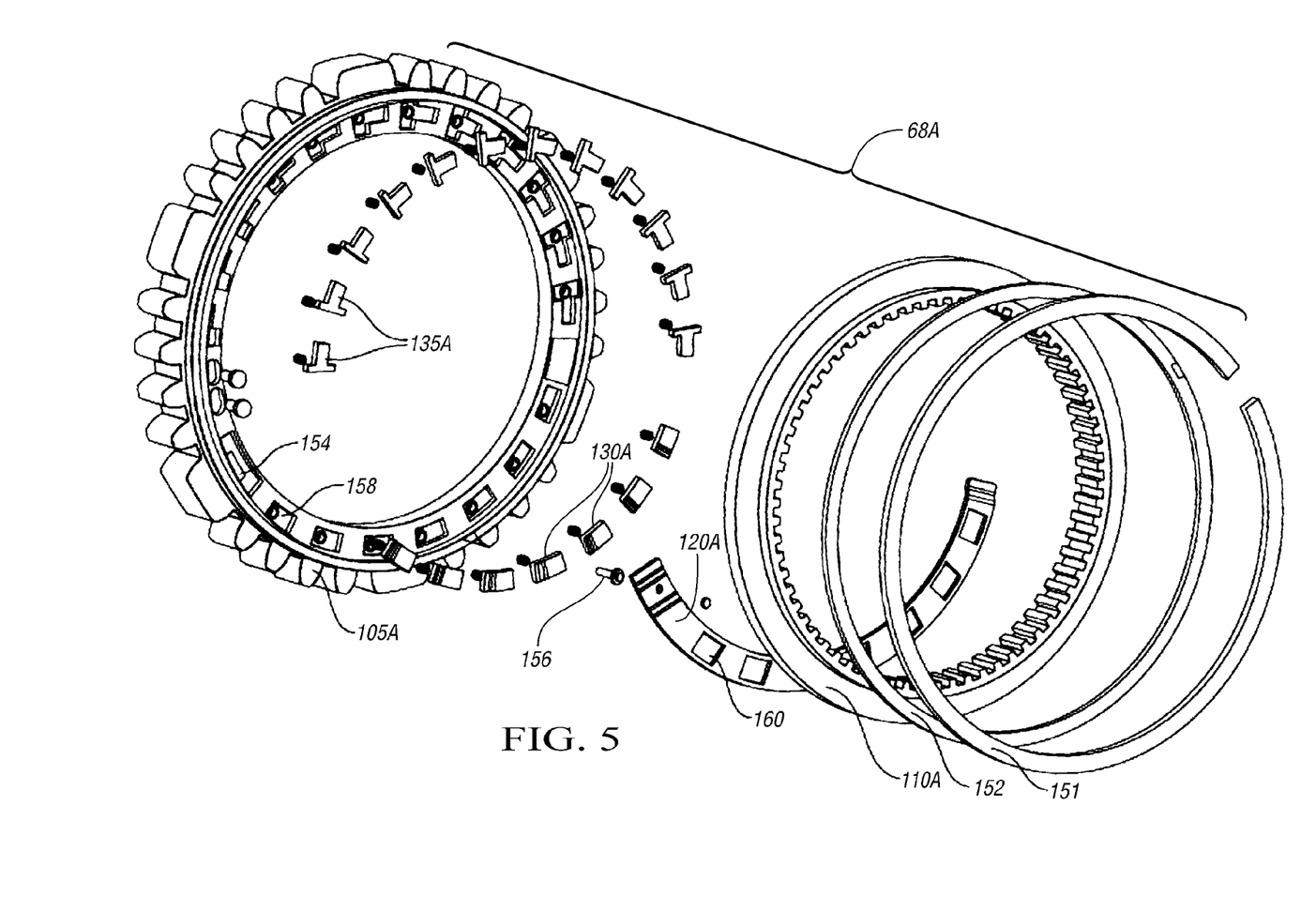
FIG. 5 is a schematic perspective exploded view of an alternative SOWBC for use with the transmissions of FIGS. 1, 6, 8, 10, 12, 14 and 16.

FIG. 5 schematically shows an alternative SOWBC 68A substantially similar to SOWBC 68 including a first element as an annular strut plate 105A and a second element as a co-annular notch plate 110A, with a selector plate as a co-annular slide plate 120A interposed therebetween. The SOWBC 68A follows the same engagement schedule as set forth for SOWBC 68 in FIG. 2, when used in lieu of SOWBC 68 in the transmissions of FIGS. 1, 6, 8, 10, 12, 14 and 16, respectively.

The strut plate 105A has a pocket-shaped design including a first side having a race into which the slide plate 120A and the notch plate 110A are assembled and held in place preferably using a snap ring 151 and a supporting ring 152. The strut plate 105A includes a pass-through slot portion 154 formed therein. The pass-through slot portion 154 comprises a circumferentially-oriented elongated opening passing through the strut plate 105A, and can be located on an annular surface of the strut plate 105A, as shown in FIG. 5, and, alternatively, can be located on an outer circumferential surface of the strut plate 105A (not shown). A pin 156 attached through an opening to the slide plate 120A passes through the slot portion 154 and slidably moves therein. In one embodiment, there is a plurality of spring-actuated retractable engagement elements or struts 130A, 135A located in strut pockets 158 located circumferentially within the pocket area of the first side of the strut plate 105A. The notch plate 110A includes a plurality of circumferentially-located notches (not shown) located co-annular to the retractable struts 130A, 135A of the strut plate 105A. The slide plate 120A is configured to slidably move in the annular race of the strut plate 105A, rotating about the common axis. The slide plate 120A includes a plurality of pass-through notch openings 160 corresponding to the retractable struts 130A of the strut plate 105A and the notches of the notch plate 110A. The slide plate 120A includes the pin 156 that projects orthogonally from an annular surface of the slide plate 120A, and passes through the slot portion 154 of the strut plate 105A. The slide plate 120A is configured to rotatably slide with respect to the strut plate 105A about the common axis, with the magnitude of the slidable movement of the slide plate 120A being circumscribed by the movement of the pin 156 and the slot portion 154 of the strut plate 105A. When the slide plate 120A rotatably slides via an actuator (not shown) to a first position with respect to the strut plate 105A, the slide plate 120A is configured to restrain the retractable struts 130A, and the notch plate 110A rotates freely with the carrier member 26 in the forward direction but is braked in the reverse direction. When the slide plate 120A rotatably slides via an actuator (not shown) to a second position with respect to the strut plate 105A, the notch openings 160 of the slide plate 120A are configured to coincide with the retractable struts 130A, allowing them to project therethrough. The retractable struts 130A can engage the notches of the notch plate 110A, and fixedly lock the carrier member 26 of FIG. 1 to the strut plate 105A, stopping it from rotating in either direction.

One skilled in the art can conceive of other configurations for engaging and disengaging the exemplary SOWBCs 68, 68A described herein by actuating and deactivating a displacement actuator using a control module.

Second Embodiment

Figure 6:
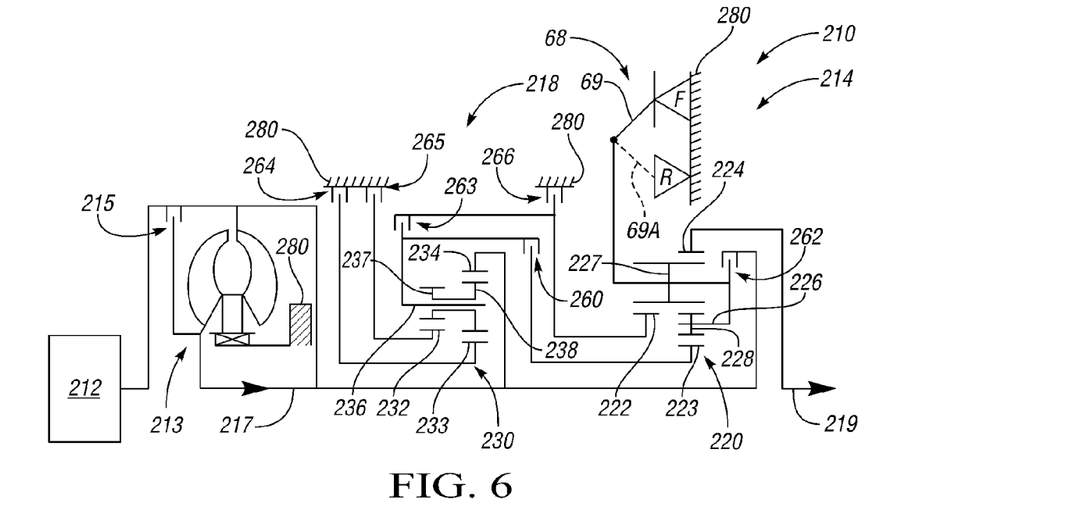
FIG. 6 is a schematic illustration in stick diagram form of a powertrain with a second embodiment of a transmission having an SOWBC.

FIG. 6 shows another embodiment of a powertrain 210. The powertrain 210 includes an engine 212 and a planetary transmission 214. The planetary transmission 214 includes an input member 217 operatively connected with the engine 212, a planetary gearing arrangement 218 and an output member 219 continuously connected with a final drive mechanism (not shown). A torque converter 213 with a lockup clutch 215, as is typical, may be positioned between the engine 212 and the input member 217. The planetary gearing arrangement 218 includes two planetary gear sets 220 and 230.

The first planetary gear set 220 is a compound planetary gear set that includes a first sun gear member 222, a second sun gear member 223, a carrier member 226, and a ring gear member 224. The carrier member 226 rotatably supports a first set of pinion gears 227 that mesh with both the sun gear member 222 and the ring gear member 224, as well as a second set of pinion gears 228 that mesh with the sun gear member 223 and the first set of pinion gears 227.

The second planetary gear set 230, also referred to herein as a set of intermeshing gears, includes a first sun gear member 232, a second sun gear member 233, a ring gear member 234, and a carrier member 236 that rotatably supports first and second sets of pinion gears 237, 238, respectively. The sets of pinion gears 237, 238 are interconnected from common rotation with one another. The first set of pinion gears 237 meshes with the sun gear member 232. The second set of pinion gears 238 meshes with the sun gear member 233 and with the ring gear member 234.

The planetary gearing arrangement 218 also includes seven torque-transmitting mechanisms 260, 262, 263, 264, 265, 266, and 68. The torque-transmitting mechanisms 260, 262 and 263 are rotating-type torque-transmitting mechanisms, commonly termed clutches. Clutches 260, 262 and 263 are multi-plate clutch devices, for example, in a friction launch configuration. The torque-transmitting mechanisms 264, 265 and 266 are stationary-type torque-transmitting mechanisms, commonly termed brakes or reaction clutches. The torque-transmitting mechanism 68 is the SOWBC discussed above with respect to FIGS. 3, 4 and 5. Clutch 260 is referred to herein as the "first clutch", clutch 263 is referred to herein as the "second clutch", clutch 262 is referred to herein as the "third clutch", and brake 266 is referred to herein as the "first brake".

The input member 217 is continuously connected with the ring gear member 234. The output member 219 is continuously connected with the ring gear member 224. Carrier member 236 is selectively connectable for common rotation with the sun gear member 223 by engagement of clutch 260. Ring gear member 234 is selectively connectable for common rotation with carrier member 226 by engagement of clutch 262. Carrier member 236 is selectively connectable for common rotation with sun gear member 222 by engagement of clutch 263. Sun gear member 233 is selectively grounded to transmission housing 280 by engagement of brake 264. Sun gear member 232 is selectively grounded to transmission housing 280 by engagement of brake 265. Sun gear member 222 is selectively grounded to transmission housing 280 by engagement of brake 266. Carrier member 226 is selectively grounded to the transmission housing 280 by engagement of the SOWBC 68 to prevent either forward or reverse rotation; i.e., set to either forward braking or reverse braking (but allowing freewheeling in forward when set to reverse braking).

Figure 7:
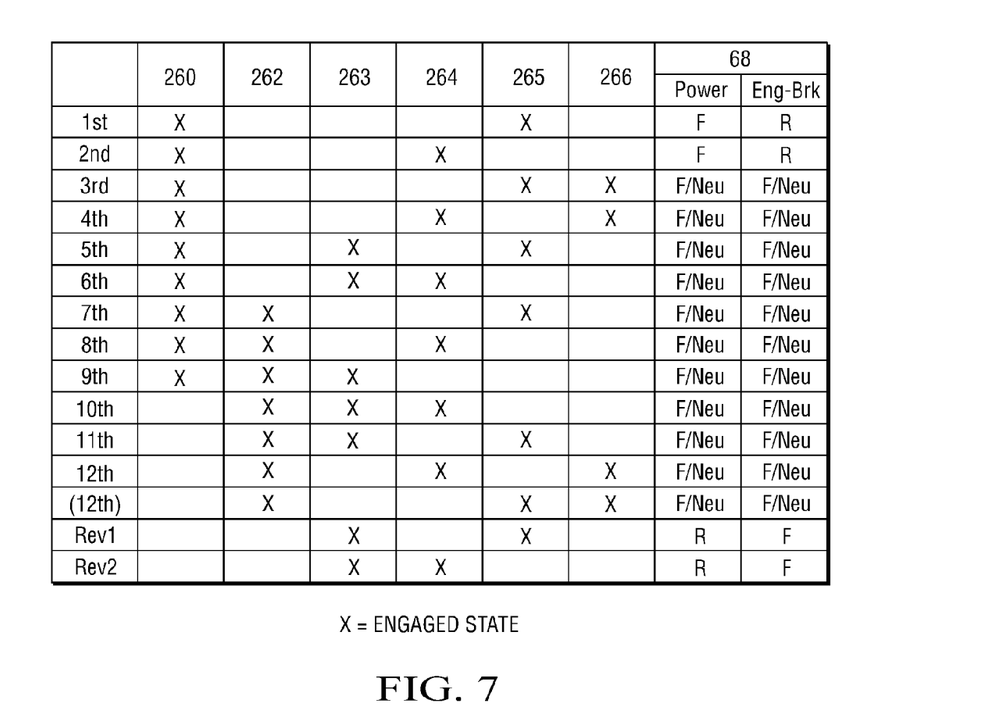
FIG. 7 is a table indicating an engagement schedule for the transmission of FIG. 6.

The torque-transmitting mechanisms 260, 262, 263, 264, 265, 266 and 68 are engagable in combinations of three according to the schedule set forth in FIG. 7 to establish two reverse speed ratios, REV1 and REV2, and twelve forward speed ratios, along with an alternate twelfth speed ratio (12th). Thus, the SOWBC is switched to the position of FIG. 4 in the reverse speed ratios (with switch 69 in the position shown in FIG. 6), switched to the position of FIG. 3 in the first and second forward speed ratios, 1st and 2nd, (with the switch in position 69A), and freewheels in the position of FIG. 3 in the third through twelfth speed ratios.

Third Embodiment

Figure 8:
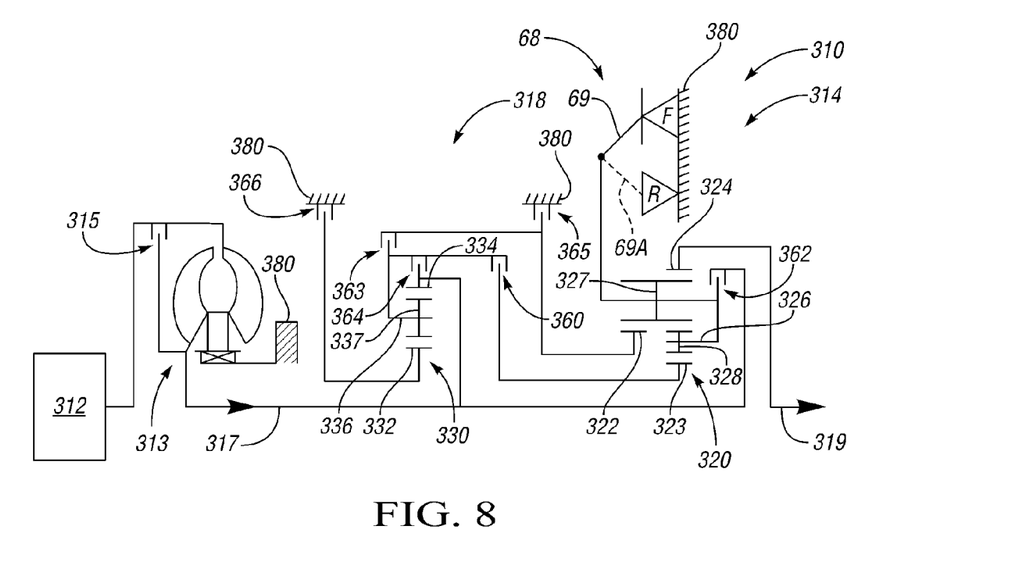
FIG. 8 is a schematic illustration in stick diagram form of a powertrain with a third embodiment of a transmission having an SOWBC.

FIG. 8 shows another embodiment of a powertrain 310. The powertrain 310 includes an engine 312 and a planetary transmission 314. The planetary transmission 314 includes an input member 317 operatively connected with the engine 312, a planetary gearing arrangement 318 and an output member 319 continuously connected with a final drive mechanism (not shown). A torque converter 313 with a lockup clutch 315, as is typical, may be positioned between the engine 312 and the input member 317. The planetary gearing arrangement 318 includes two planetary gear sets 320 and 330.

The first planetary gear set 320 is a compound planetary gear set that includes a first sun gear member 322, a second sun gear member 323, a carrier member 326, and a ring gear member 324. The carrier member 326 rotatably supports a first set of pinion gears 327 that meshes with both the sun gear member 322 and the ring gear member 324, as well as a second set of pinion gears 328 that meshes with the sun gear member 323 and the first set of pinion gears 327.

The second planetary gear set 330, also referred to herein as a set of intermeshing gears, includes a sun gear member 332, a ring gear member 334, and a carrier member 336 that rotatably supports a set of pinion gears 337 that meshes with the sun gear member 332 and with the ring gear member 334.

The planetary gearing arrangement 318 also includes seven torque-transmitting mechanisms 360, 362, 363, 364, 365, 366, and 68. The torque-transmitting mechanisms 360, 362, 363 and 364 are rotating-type torque-transmitting mechanisms, commonly termed clutches. Clutches 360, 362, 363 and 364 are multi-plate clutch devices, for example, in a friction launch configuration. The torque-transmitting mechanisms 365 and 366 are stationary-type torque-transmitting mechanisms, commonly termed brakes or reaction clutches. The torque-transmitting mechanism 68 is the SOWBC discussed above with respect to FIGS. 3, 4 and 5. Clutch 360 is referred to herein as the "first clutch", clutch 363 is referred to herein as the "second clutch", clutch 362 is referred to herein as the "third clutch", and brake 366 is referred to herein as the "first brake".

The input member 317 is continuously connected with the ring gear member 334. The output member 319 is continuously connected with the ring gear member 324. Carrier member 336 is selectively connectable for common rotation with the sun gear member 323 by engagement of clutch 360. Ring gear member 334 is selectively connectable for common rotation with carrier member 326 by engagement of clutch 362. Carrier member 336 is selectively connectable for common rotation with sun gear member 322 by engagement of clutch 363. Ring gear member 334 is selectively connectable for common rotation with carrier member 336 by engagement of clutch 364. Sun gear member 322 is selectively grounded to transmission housing 380 by engagement of brake 365. Sun gear member 332 is selectively grounded to the transmission housing 380 by engagement of the brake 366. Carrier member 326 is selectively grounded to the transmission housing 380 by engagement of the SOWBC 68 to prevent either forward or reverse rotation; i.e., set to either forward braking or reverse braking (but allowing freewheeling in forward when set to reverse braking).

Figure 9:
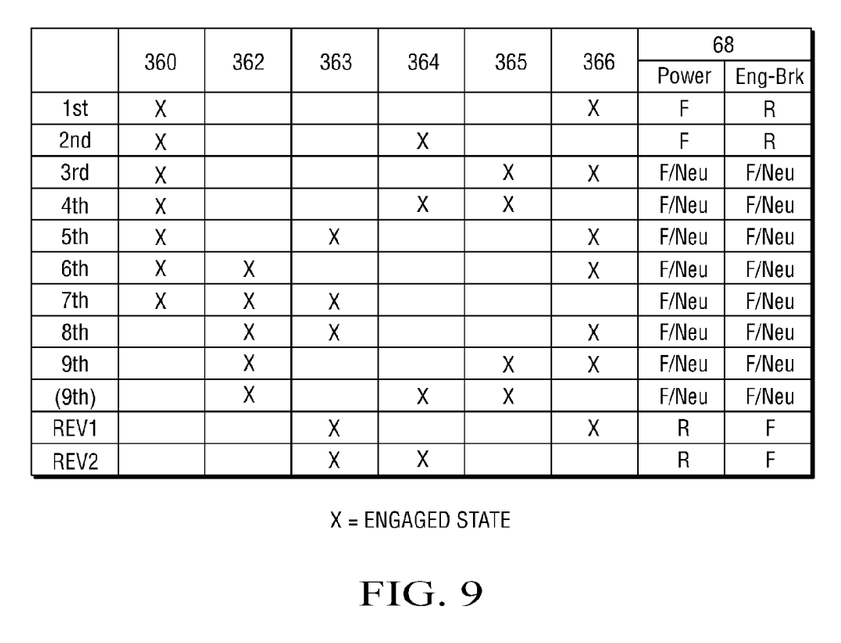
FIG. 9 is a table indicating an engagement schedule for the transmission of FIG. 8.

The torque-transmitting mechanisms 360, 362, 363, 364, 365, 366 and 68 are engagable in combinations of three according to the schedule set forth in FIG. 9 to establish two reverse speed ratios, REV1 and REV2, and nine forward speed ratios, along with an alternate ninth speed ratio (9th). Thus, the SOWBC is switched to the position of FIG. 4 in the reverse speed ratios (with switch 69 in the position shown in FIG. 6), switched to the position of FIG. 3 in the first and second forward speed ratios, 1st and 2nd, (with the switch in position 69A), and freewheels in the position of FIG. 3 in the third through ninth speed ratios.

Fourth Embodiment

Figure 10:
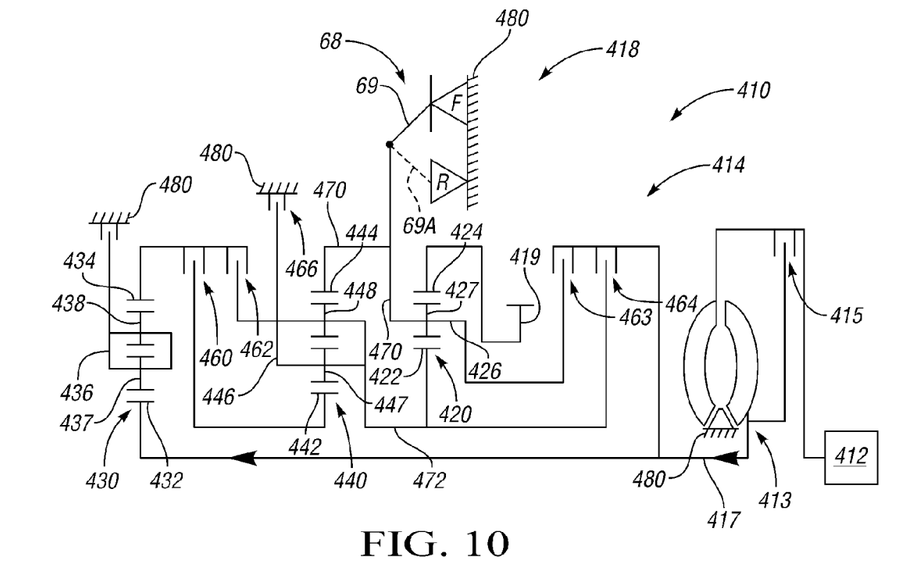
FIG. 10 is a schematic illustration in stick diagram form of a powertrain with a fourth embodiment of a transmission having an SOWBC.

FIG. 10 shows another embodiment of a powertrain 410. The powertrain 410 includes an engine 412 and a planetary transmission 414. The planetary transmission 414 includes an input member 417 operatively connected with the engine 412, a planetary gearing arrangement 418 and an output member 419 continuously connected with a final drive mechanism (not shown). A torque converter 413 with a lockup clutch 415, as is typical, may be positioned between the engine 412 and the input member 417. The planetary gearing arrangement 418 includes three planetary gear sets 420, 430 and 440.

The first planetary gear set 420 is a simple planetary gear set that includes a sun gear member 422, a carrier member 426, and a ring gear member 424. The carrier member 426 rotatably supports a set of pinion gears 427 that mesh with both the sun gear member 422 and the ring gear member 424.

The second planetary gear set 430, also referred to herein as a set of intermeshing gears, is a double pinion-type planetary gear set that includes a sun gear member 432, a ring gear member 434, and a carrier member 436 that rotatably supports a first set of pinion gears 437 and a second set of pinion gears 438. The first set of pinion gears 437 meshes with the sun gear member 432 and with the second set of pinion gears 438. The second set of pinion gears 438 meshes with the first set of pinion gears 437 and with the ring gear member 434.

The third planetary gear set 440 is a double pinion-type planetary gear set that includes a sun gear member 442, a ring gear member 444, and a carrier member 446 that rotatably supports a first set of pinion gears 447 and a second set of pinion gears 448. The first set of pinion gears 447 meshes with the sun gear member 442 and with the second set of pinion gears 448. The second set of pinion gears 448 meshes with the first set of pinion gears 447 and with the ring gear member 444.

The planetary gearing arrangement 418 also includes six torque-transmitting mechanisms 460, 462, 463, 464, 466, and 68. The torque-transmitting mechanisms 460, 462, 463 and 464 are rotating-type torque-transmitting mechanisms, commonly termed clutches. Clutches 460, 462, 463 and 464 are multi-plate clutch devices, for example, in a friction launch configuration. The torque-transmitting mechanism 466 is a stationary-type torque-transmitting mechanism, commonly termed a brake or reaction clutch. The torque-transmitting mechanism 68 is the SOWBC discussed above with respect to FIGS. 3, 4 and 5. Clutch 460 is referred to herein as the "first clutch", clutch 462 is referred to herein as the "second clutch", clutch 463 is referred to herein as the "third clutch", clutch 464 is referred to herein as a "fourth clutch", and brake 466 is referred to herein as the "first brake".

The input member 417 is continuously connected with the sun gear member 432. The output member 419 is continuously connected with the ring gear member 424. Carrier member 436 is continuously grounded to the transmission housing 480. Interconnecting member 470 continuously connects ring gear member 444 for common rotation with carrier member 426. Interconnecting member 472 continuously connects carrier member 446 for common rotation with sun gear member 422. Ring gear member 434 is selectively connectable for common rotation with the sun gear member 442 by engagement of clutch 460. Ring gear member 434 is selectively connectable for common rotation with carrier member 446 by engagement of clutch 462. Carrier member 426 is selectively connectable for common rotation with sun gear member 432 by engagement of clutch 463. Sun gear member 422 is selectively connectable for common rotation with sun gear member 432 by engagement of clutch 464. Carrier member 446 is selectively grounded to transmission housing 480 by engagement of brake 466. Carrier member 426 is selectively grounded to the transmission housing 480 by engagement of the SOWBC 68 to prevent either forward or reverse rotation; i.e., set to either forward braking or reverse braking (but allowing freewheeling in forward when set to reverse braking).

Figure 11:
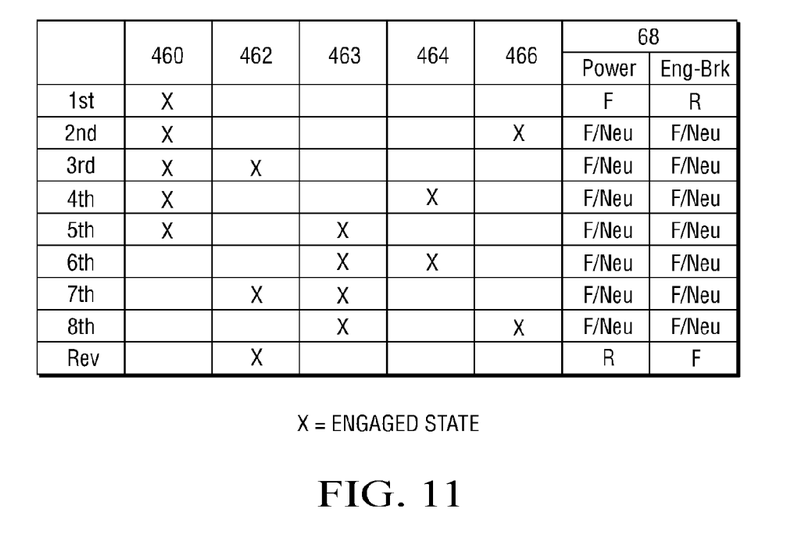
FIG. 11 is a table indicating an engagement schedule for the transmission of FIG. 10.

The torque-transmitting mechanisms 460, 462, 463, 464, 466 and 68 are engagable in combinations of two according to the schedule set forth in FIG. 11 to establish a reverse speed ratio, Rev, and eight forward speed ratios. Thus, the SOWBC is switched to the position of FIG. 4 in the reverse speed ratio (with switch 69 in the position shown in FIG. 6), switched to the position of FIG. 3 in the first forward speed ratio, 1st, (with the switch in position 69A), and freewheels in the position of FIG. 3 in the second through eighth speed ratios.

Fifth Embodiment

Figure 12:
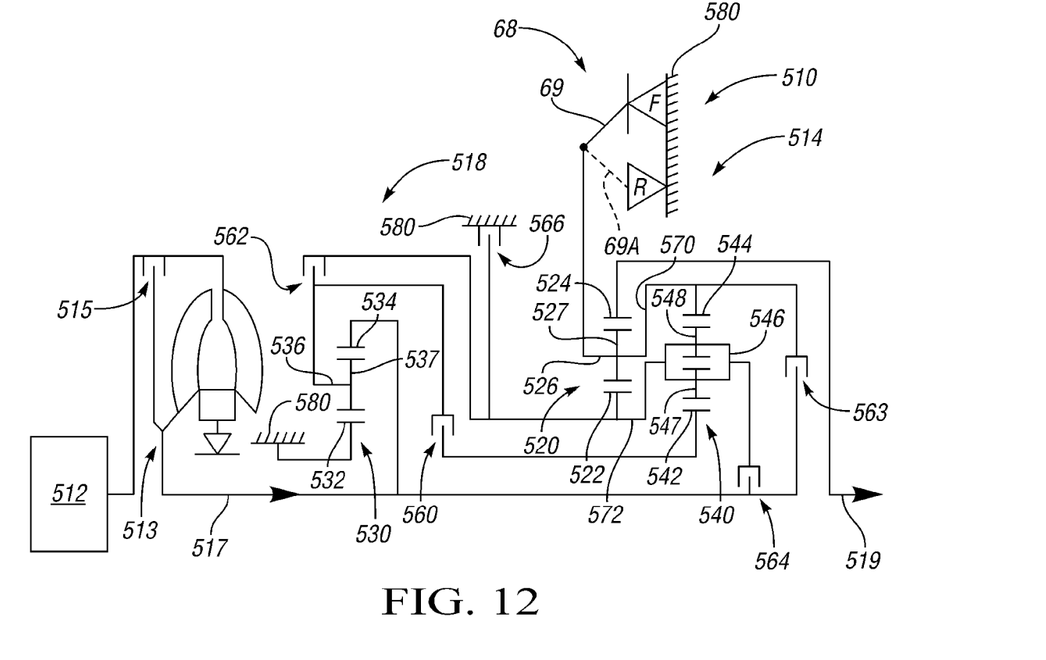
FIG. 12 is a schematic illustration in stick diagram form of a powertrain with a fifth embodiment of a transmission having an SOWBC.

FIG. 12 shows another embodiment of a powertrain 510. The powertrain 510 includes an engine 512 and a planetary transmission 514. The planetary transmission 514 includes an input member 517 operatively connected with the engine 512, a planetary gearing arrangement 518 and an output member 519 continuously connected with a final drive mechanism (not shown). A torque converter 513 with a lockup clutch 515, as is typical, may be positioned between the engine 512 and the input member 517. The planetary gearing arrangement 518 includes three planetary gear sets 520, 530 and 540.

The first planetary gear set 520 is a simple planetary gear set that includes a sun gear member 522, a carrier member 526, and a ring gear member 524. The carrier member 526 rotatably supports a set of pinion gears 527 that meshes with both the sun gear member 522 and the ring gear member 524.

The second planetary gear set 530, also referred to herein as a set of intermeshing gears, includes a sun gear member 532, a ring gear member 534, and a carrier member 536 that rotatably supports a set of pinion gears 537 that meshes with the sun gear member 532 and with the ring gear member 534.

The third planetary gear set 540 is a double pinion-type planetary gear set that includes a sun gear member 542, a ring gear member 544, and a carrier member 546 that rotatably supports a first set of pinion gears 547 and a second set of pinion gears 548. The first set of pinion gears 547 meshes with the sun gear member 542 and with the second set of pinion gears 548. The second set of pinion gears 548 meshes with the first set of pinion gears 547 and with the ring gear member 544.

The planetary gearing arrangement 518 also includes six torque-transmitting mechanisms 560, 562, 563, 564, 566, and 68. The torque-transmitting mechanisms 560, 562, 563 and 564 are rotating-type torque-transmitting mechanisms, commonly termed clutches. Clutches 560, 562, 563 and 564 are multi-plate clutch devices, for example, in a friction launch configuration. The torque-transmitting mechanism 566 is a stationary-type torque-transmitting mechanism, commonly termed a brake or reaction clutch. The torque-transmitting mechanism 68 is the SOWBC discussed above with respect to FIGS. 3, 4 and 5. Clutch 560 is referred to herein as the "first clutch", clutch 562 is referred to herein as the "second clutch", clutch 563 is referred to herein as the "third clutch", clutch 564 is referred to herein as a "fourth clutch", and brake 566 is referred to herein as the "first brake".

The input member 517 is continuously connected with the ring gear member 534. The output member 519 is continuously connected with the ring gear member 524. Sun gear member 532 is continuously grounded to the transmission housing 580. Interconnecting member 570 continuously connects ring gear member 544 for common rotation with carrier member 526. Interconnecting member 572 continuously connects carrier member 546 for common rotation with sun gear member 522. Carrier member 536 is selectively connectable for common rotation with the sun gear member 542 by engagement of clutch 560. Carrier member 536 is selectively connectable for common rotation with sun gear member 522 by engagement of clutch 562. Ring gear member 544 is selectively connectable for common rotation with ring gear member 534 by engagement of clutch 563. Ring gear member 534 is selectively connectable for common rotation with carrier member 546 by engagement of clutch 564. Sun gear member 522 is selectively grounded to transmission housing 580 by engagement of brake 566. Carrier member 526 is selectively grounded to the transmission housing 580 by engagement of the SOWBC 68 to prevent either forward or reverse rotation; i.e., set to either forward braking or reverse braking (but allowing freewheeling in forward when set to reverse braking).

Figure 13:
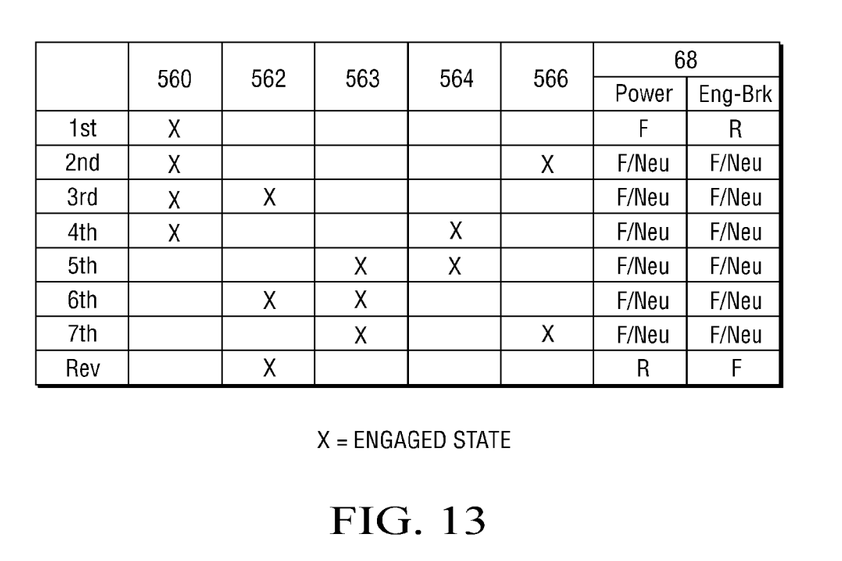
FIG. 13 is a table indicating an engagement schedule for the transmission of FIG. 12.

The torque-transmitting mechanisms 560, 562, 563, 564, 566 and 68 are engagable in combinations of two according to the schedule set forth in FIG. 13 to establish a reverse speed ratio, Rev, and seven forward speed ratios. Thus, the SOWBC is switched to the position of FIG. 4 in the reverse speed ratio (with switch 69 in the position shown in FIG. 6), switched to the position of FIG. 3 in the first forward speed ratio, 1st, (with the switch in position 69A), and freewheels in the position of FIG. 3 in the second through seventh speed ratios.

Sixth Embodiment

Figure 14:
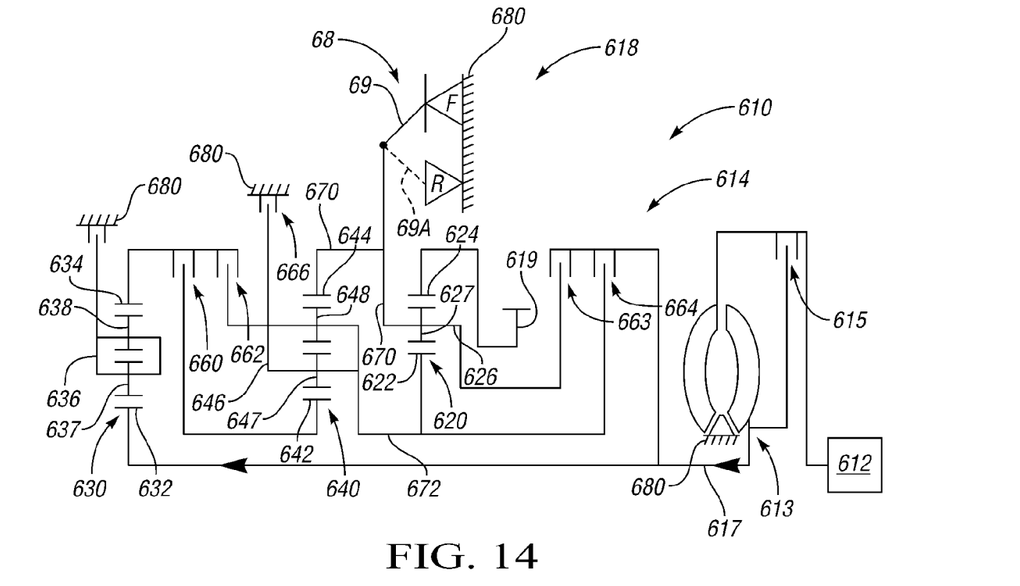
FIG. 14 is a schematic illustration in stick diagram form of a powertrain with a sixth embodiment of a transmission having an SOWBC.

FIG. 14 shows another embodiment of a powertrain 610. The powertrain 610 includes an engine 612 and a planetary transmission 614. The planetary transmission 614 includes an input member 617 operatively connected with the engine 612, a planetary gearing arrangement 618 and an output member 619 continuously connected with a final drive mechanism (not shown). A torque converter 613 with a lockup clutch 615, as is typical, may be positioned between the engine 612 and the input member 617. The planetary gearing arrangement 618 includes three planetary gear sets 620, 630 and 640.

The first planetary gear set 620 is a simple planetary gear set that includes a sun gear member 622, a carrier member 626, and a ring gear member 624. The carrier member 626 rotatably supports a set of pinion gears 627 that mesh with both the sun gear member 622 and the ring gear member 624.

The second planetary gear set 630, also referred to herein as a set of intermeshing gears, is a double pinion-type planetary gear set that includes a sun gear member 632, a ring gear member 634, and a carrier member 636 that rotatably supports a first set of pinion gears 637 and a second set of pinion gears 638. The first set of pinion gears 637 meshes with the sun gear member 632 and with the second set of pinion gears 638. The second set of pinion gears 638 mesh with the first set of pinion gears 637 and with the ring gear member 634.

The third planetary gear set 640 is a double pinion-type planetary gear set that includes a sun gear member 642, a ring gear member 644, and a carrier member 646 that rotatably supports a first set of pinion gears 647 and a second set of pinion gears 648. The first set of pinion gears 647 meshes with the sun gear member 642 and with the second set of pinion gears 648. The second set of pinion gears 648 meshes with the first set of pinion gears 647 and with the ring gear member 644.

The planetary gearing arrangement 618 also includes six torque-transmitting mechanisms 660, 662, 663, 664, 666, and 68. The torque-transmitting mechanisms 660, 662, 663 and 664 are rotating-type torque-transmitting mechanisms, commonly termed clutches. Clutches 660, 662, 663 and 664 are multi-plate clutch devices, for example, in a friction launch configuration. The torque-transmitting mechanism 666 is a stationary-type torque-transmitting mechanism, commonly termed a brake or reaction clutch. The torque-transmitting mechanism 68 is the SOWBC discussed above with respect to FIGS. 3, 4 and 5. Clutch 660 is referred to herein as the "first clutch", clutch 662 is referred to herein as the "second clutch", clutch 663 is referred to herein as the "third clutch", clutch 664 is referred to herein as a "fourth clutch", and brake 666 is referred to herein as the "first brake".

The input member 617 is continuously connected with the sun gear member 632. The output member 619 is continuously connected with the ring gear member 624. Carrier member 636 is continuously grounded to the transmission housing 680. Interconnecting member 670 continuously connects ring gear member 644 for common rotation with carrier member 626. Interconnecting member 672 continuously connects carrier member 646 for common rotation with sun gear member 622. Ring gear member 634 is selectively connectable for common rotation with the sun gear member 642 by engagement of clutch 660. Ring gear member 634 is selectively connectable for common rotation with carrier member 646 by engagement of clutch 662. Carrier member 626 is selectively connectable for common rotation with sun gear member 632 by engagement of clutch 663. Sun gear member 622 is selectively connectable for common rotation with sun gear member 632 by engagement of clutch 664. Carrier member 646 is selectively grounded to transmission housing 680 by engagement of brake 666. Carrier member 626 is selectively grounded to the transmission housing 680 by engagement of the SOWBC 68 to prevent either forward or reverse rotation; i.e., set to either forward braking or reverse braking (but allowing freewheeling in forward when set to reverse braking).

Figure 15:
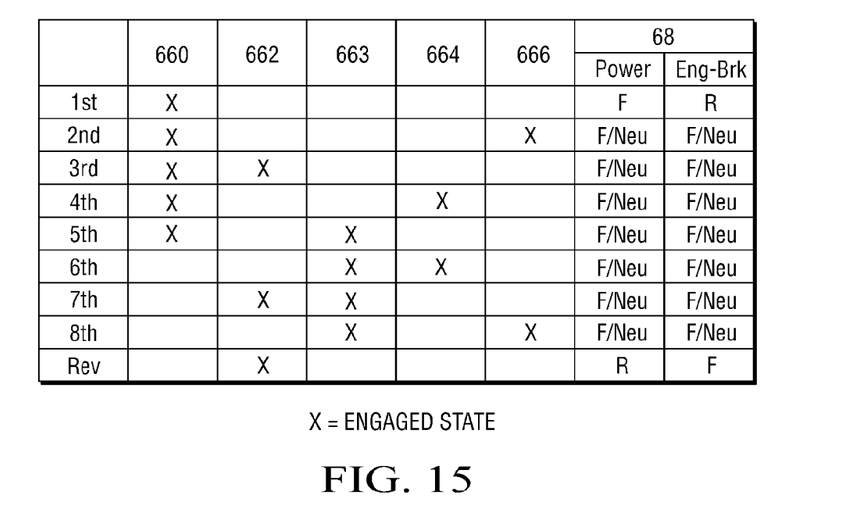
FIG. 15 is a table indicating an engagement schedule for the transmission of FIG. 14.

The torque-transmitting mechanisms 660, 662, 663, 664, 666 and 68 are engagable in combinations of two according to the schedule set forth in FIG. 15 to establish a reverse speed ratio, Rev, and eight forward speed ratios. Thus, the SOWBC is switched to the position of FIG. 4 in the reverse speed ratio (with switch 69 in the position shown in FIG. 6), switched to the position of FIG. 3 in the first forward speed ratio, 1st, (with the switch in position 69A), and freewheels in the position of FIG. 3 in the second through eighth speed ratios.

Seventh Embodiment

Figure 16:
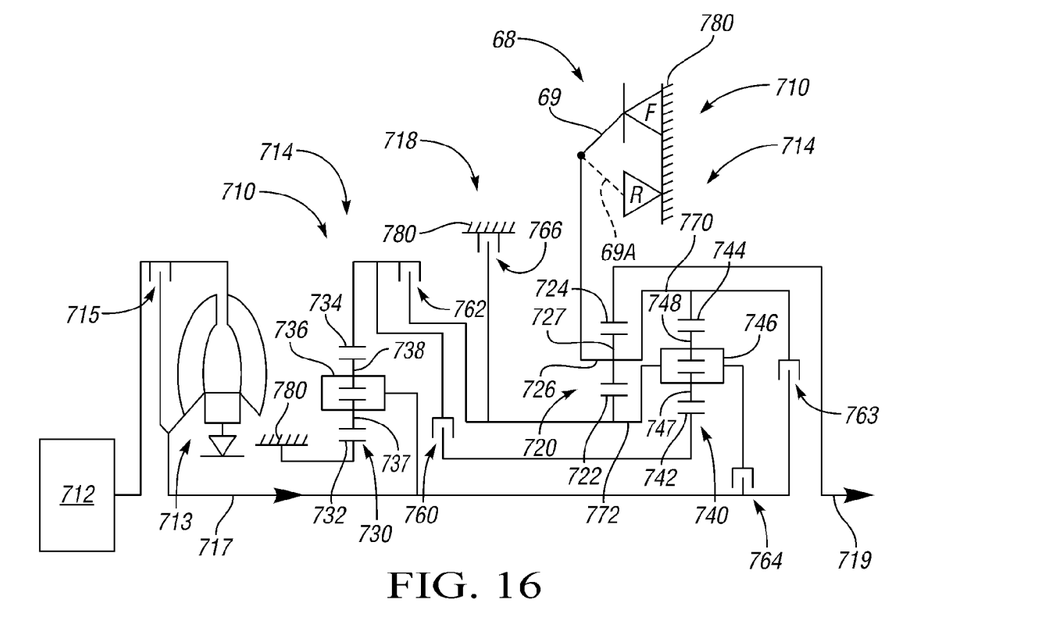
FIG. 16 is a schematic illustration in stick diagram form of a powertrain with a seventh embodiment of a transmission having an SOWBC.

FIG. 16 shows another embodiment of a powertrain 710. The powertrain 710 includes an engine 712 and a planetary transmission 714. The planetary transmission 714 includes an input member 717 operatively connected with the engine 712, a planetary gearing arrangement 718 and an output member 719 continuously connected with a final drive mechanism (not shown). A torque converter 713 with a lockup clutch 715, as is typical, may be positioned between the engine 712 and the input member 717. The planetary gearing arrangement 718 includes three planetary gear sets 720, 730 and 740.

The first planetary gear set 720 is a simple planetary gear set that includes a sun gear member 722, a carrier member 726, and a ring gear member 724. The carrier member 726 rotatably supports a set of pinion gears 727 that meshes with both the sun gear member 722 and the ring gear member 724.

The second planetary gear set 730, also referred to herein as a set of intermeshing gears, is a double pinion-type planetary gear set that includes a sun gear member 732, a ring gear member 734, and a carrier member 736 that rotatably supports a first set of pinion gears 737 and a second set of pinion gears 738. The first set of pinion gears 737 meshes with the sun gear member 732 and with the second set of pinion gears 738. The second set of pinion gears 738 meshes with the first set of pinion gears 737 and with the ring gear member 734.

The third planetary gear set 740 is a double pinion-type planetary gear set that includes a sun gear member 742, a ring gear member 744, and a carrier member 746 that rotatably supports a first set of pinion gears 747 and a second set of pinion gears 748. The first set of pinion gears 747 meshes with the sun gear member 742 and with the second set of pinion gears 748. The second set of pinion gears 748 meshes with the first set of pinion gears 747 and with the ring gear member 744.

The planetary gearing arrangement 718 also includes six torque-transmitting mechanisms 760, 762, 763, 764, 766, and 68. The torque-transmitting mechanisms 760, 762, 763 and 764 are rotating-type torque-transmitting mechanisms, commonly termed clutches. Clutches 760, 762, 763 and 764 are multi-plate clutch devices, for example, in a friction launch configuration. The torque-transmitting mechanism 766 is a stationary-type torque-transmitting mechanism, commonly termed a brake or reaction clutch. The torque-transmitting mechanism 68 is the SOWBC discussed above with respect to FIGS. 3, 4 and 5. Clutch 760 is referred to herein as the "first clutch", clutch 762 is referred to herein as the "second clutch", clutch 763 is referred to herein as the "third clutch", clutch 764 is referred to herein as a "fourth clutch", and brake 766 is referred to herein as the "first brake".

The input member 717 is continuously connected with the carrier member 736. The output member 719 is continuously connected with the ring gear member 724. Sun gear member 732 is continuously grounded to the transmission housing 780. Interconnecting member 770 continuously connects ring gear member 744 for common rotation with carrier member 726. Interconnecting member 772 continuously connects carrier member 746 for common rotation with sun gear member 722. Ring gear member 734 is selectively connectable for common rotation with the sun gear member 742 by engagement of clutch 760. Ring gear member 734 is selectively connectable for common rotation with sun gear member 722 by engagement of clutch 762. Carrier member 736 is selectively connectable for common rotation with ring gear member 744 by engagement of clutch 763. Carrier member 736 is selectively connectable for common rotation with carrier member 746 by engagement of clutch 764. Sun gear member 722 is selectively grounded to transmission housing 780 by engagement of brake 766. Carrier member 726 is selectively grounded to the transmission housing 780 by engagement of the SOWBC 68 to prevent either forward or reverse rotation; i.e., set to either forward braking or reverse braking (but allowing freewheeling in forward when set to reverse braking).

Figure 17:
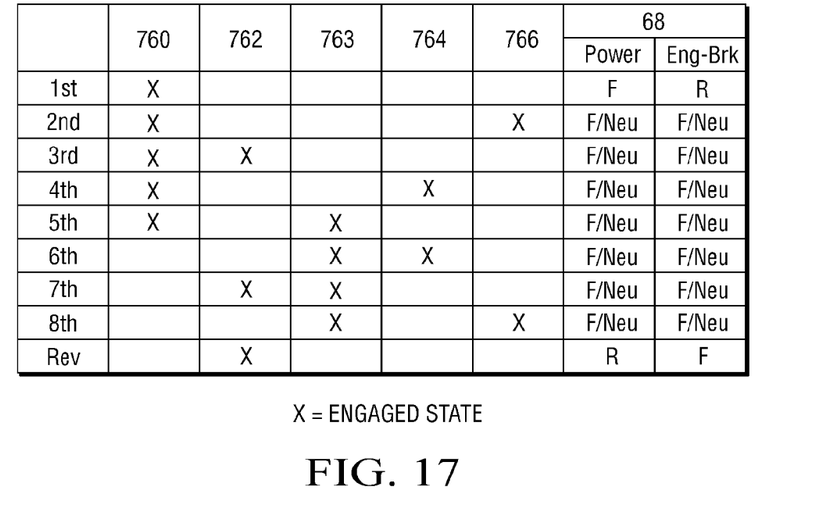
FIG. 17 is a table indicating an engagement schedule for the transmission of FIG. 16.

The torque-transmitting mechanisms 760, 762, 763, 764, 766 and 68 are engagable in combinations of two according to the schedule set forth in FIG. 17 to establish a reverse speed ratio, Rev, and eight forward speed ratios. Thus, the SOWBC 68 is switched to the position of FIG. 4 in the reverse speed ratio (with switch 69 in the position shown in FIG. 6), switched to the position of FIG. 3 in the first forward speed ratio, 1st, (with the switch in position 69A), and freewheels in the position of FIG. 3 in the second through eighth speed ratios.

While the best modes for carrying out the invention have been described in detail, those familiar with the art to which this invention relates will recognize various alternative designs and embodiments for practicing the invention within the scope of the appended claims.

The invention claimed is:

1. A transmission for a vehicle comprising:
   an input member;
   an output member;
   a stationary member;
   a set of intermeshing gears; wherein the input member is continuously or selectively connected for rotation with a member of the set of intermeshing gears;
   a planetary gear set having a carrier member rotatably supporting first and second sets of pinion gears, a first sun gear member meshing with the first set of pinion gears, a second sun gear member meshing with the second set of pinion gears, a ring gear member meshing with the first set of pinion gears, and wherein the first and second sets of pinion gears mesh with one another;
   wherein the output member is connected for rotation with one of the members of the planetary gear set;

first and second selectively engageable rotating clutches engageable to connect different members of the planetary gear set and set of intermeshing gears for common rotation;
a selectable one-way braking clutch configured to brake in one rotational direction and selectively reversible to brake in an opposite rotational direction, wherein the selectable one-way braking clutch has a member directly and continuously held stationary by the stationary member so that the selectable one-way clutch brakes rotation of the carrier member of the planetary gear set when the transmission is in reverse and first forward speed ratios without any other clutch used in series or parallel with the selectable one-way braking clutch to connect the carrier member of the planetary gear set to the stationary member;
wherein the first rotating clutch is engaged and the selectable one-way braking clutch brakes reverse rotation of the carrier member to transmit torque from the input member to the output member in the first forward speed ratio; and
wherein the second rotating clutch is engaged and the selectable one-way braking clutch brakes forward rotation of the carrier member to transmit torque from the input member to the output member in the reverse speed ratio.

2. The transmission of claim 1, further comprising:
a first brake selectively engageable to ground the first sun gear member of the planetary gear set to the stationary member.

3. The transmission of claim 1, further comprising:
a third rotating clutch selectively engageable to connect the carrier member of the planetary gear set to the input member.

4. The transmission of claim 1, wherein the planetary gear set is a first planetary gear set; wherein the set of intermeshing gears is a second planetary gear set having another ring gear member, and further comprising:
a fourth rotating clutch selectively engageable to connect the ring gear member of the second planetary gear set to one of the sun gear members of the first planetary gear set.

5. The transmission of claim 1, wherein the planetary gear set is a first planetary gear set; wherein the set of intermeshing gears is a second planetary gear set having another sun gear member continuously grounded to the stationary member.

6. The transmission of claim 1, wherein the output member is continuously connected for common rotation with the ring gear member of the planetary gear set.

7. The transmission of claim 1, wherein the planetary gear set is a first planetary gear set;
wherein the set of intermeshing gears is a second planetary gear set having:
a carrier member;
at least one set of pinion gears rotatably supported on the carrier member;
at least one sun gear member meshing with the at least one set of pinion gears; and
at least one ring gear member meshing with the at least one set of pinion gears;
wherein the first rotating clutch is selectively engageable to connect the second sun gear member of the first planetary gear set for common rotation with the ring member of the second planetary gear set.

8. The transmission of claim 1, wherein the planetary gear set is a first planetary gear set;
wherein the set of intermeshing gears is a second planetary gear set having:
a carrier member;
at least one set of pinion gears rotatably supported on the carrier member;
at least one sun gear member meshing with the at least one set of pinion gears; and
at least one ring gear member meshing with the at least one set of pinion gears;
wherein the second rotating clutch is selectively engageable to connect the carrier member of the second planetary gear set for common rotation with the first sun gear member of the first planetary gear set.

9. The transmission of claim 1, wherein the planetary gear set is a first planetary gear set;
wherein the set of intermeshing gears is a second planetary gear set having:
a carrier member;
at least one set of pinion gears rotatably supported on the carrier member;
at least one sun gear member meshing with the at least one set of pinion gears; and
at least one ring gear member meshing with the at least one set of pinion gears; and
further comprising:
a fourth rotating clutch selectively engageable to connect the first sun gear member of the first planetary gear set for common rotation with the ring gear member of the second planetary gear set.

10. The transmission of claim 1, further comprising:
additional selectively engageable torque-transmitting mechanisms engageable to connect different members of the planetary gear set and the set of intermeshing gears for common rotation or to the stationary member;
wherein the rotating clutches, the selectable one-way braking clutch, and the additional selectively engageable torque-transmitting mechanisms are selectively engageable to provide the reverse speed ratio and eight forward speed ratios between the input member and the output member, including the first forward speed ratio, with the selectable one-way clutch free-wheeling in some of the forward speed ratios.

* * * * *